(12) United States Patent
Hurd

(10) Patent No.: US 9,772,164 B2
(45) Date of Patent: Sep. 26, 2017

(54) SCOPE CAMERA SYSTEM

(71) Applicant: Redrock Microsystems, LLC, Flower Mound, TX (US)

(72) Inventor: James D. Hurd, Flower Mound, TX (US)

(73) Assignee: REDROCK MICROSYSTEMS, LLC, Flower Mound, TX (US)

( * ) Notice: Subject to any disclaimer, the term of this patent is extended or adjusted under 35 U.S.C. 154(b) by 291 days.

(21) Appl. No.: 14/701,438

(22) Filed: Apr. 30, 2015

(65) Prior Publication Data

US 2015/0319377 A1 Nov. 5, 2015

Related U.S. Application Data

(60) Provisional application No. 61/986,273, filed on Apr. 30, 2014.

(51) Int. Cl.
*H04N 7/18* (2006.01)
*F41G 1/38* (2006.01)
*H04N 5/28* (2006.01)
*G01J 1/04* (2006.01)

(52) U.S. Cl.
CPC .............. *F41G 1/38* (2013.01); *G01J 1/04* (2013.01); *G01J 1/0411* (2013.01); *G01J 1/0414* (2013.01); *H04N 5/28* (2013.01)

(58) Field of Classification Search
CPC ...... F41G 1/38; H04N 5/28; G01J 1/04; G01J 1/0411; G01J 1/0414

USPC ........................................................... 348/61
See application file for complete search history.

(56) References Cited

U.S. PATENT DOCUMENTS

| 2004/0031184 | A1* | 2/2004 | Hope | F41C 27/00 42/111 |
|---|---|---|---|---|
| 2008/0049233 | A1* | 2/2008 | De Groot | G01B 9/02044 356/511 |
| 2014/0104490 | A1* | 4/2014 | Hsieh | H04N 5/2252 348/375 |
| 2014/0110483 | A1* | 4/2014 | Benson | G05B 1/01 235/404 |

* cited by examiner

*Primary Examiner* — Allen Wong
(74) *Attorney, Agent, or Firm* — Daniel J. Chalker; Chalker Flores, LLP

(57) ABSTRACT

An imaging device has an optoelectronic detector, a beam splitter, a field lens, a mirror, a control circuit, a memory and a power source disposed within a housing. The housing is configured to be mounted in an optical path of a scope. The optoelectronic detector is mounted outside of the optical path of the scope. The beam splitter is mounted in line with the optical path of the scope. The field lens is mounted in line with a reflected optical path of the beam splitter. The mirror is mounted such that the reflected optical path of the beam splitter from the field lens is reflected to the optoelectronic detector. The control circuit is connected to the optoelectronic detector. The memory is connected to the control circuit. A user interface is mounted on the housing and connected to the control circuit. The power source is connected to the control circuit.

27 Claims, 4 Drawing Sheets

SCOPE CAMERA SYSTEM

CROSS-REFERENCE TO RELATED APPLICATIONS

This non-provisional Patent Application claims priority to U.S. Provisional Patent Application Ser. No. 61/986,273, filed Apr. 30, 2014, entitled "Espy Scope Camera System," the contents of which is incorporated by reference herein in its entirety.

INCORPORATION-BY-REFERENCE OF MATERIALS FILED ON COMPACT DISC

None.

TECHNICAL FIELD OF THE INVENTION

The present invention relates in general to optics and more specifically to a scope camera system.
STATEMENT OF FEDERALLY FUNDED RESEARCH
None.

BACKGROUND OF THE INVENTION

Without limiting the scope of the invention, its background is described in connection with gun, sighting, spotting and targeting scopes. Existing technology uses cameras in the sightline of gun, sighting, spotting and targeting scopes that do not allow the user to be or see in the sight line of the scope.

SUMMARY OF THE INVENTION

The imaging device allows one or more images, which someone views thru a gun, sighting, spotting and targeting scope, to be unobtrusively recorded or viewed by another person. Moreover, the imaging device is lightweight and does not materially alter the weight distribution of a gun or the mounting of a scope on the gun. The imaging device can be used for hunting, bird watching, surveillance, training, governmental and military applications, etc.

One embodiment of the present invention provides an imaging device having a housing, an optoelectronic detector, a beam splitter, a field lens, a mirror, a control circuit, a memory, a user interface and a power source. The housing is configured to be mounted in an optical path of a scope. The optoelectronic detector is mounted within the housing outside of the optical path of the scope. The beam splitter is mounted within the housing in line with the optical path of the scope. The field lens is mounted within the housing in line with a reflected optical path of the beam splitter. The mirror is mounted within the housing such that the reflected optical path of the beam splitter from the field lens is reflected to the optoelectronic detector. The control circuit is disposed within the housing and connected to the optoelectronic detector. The memory is disposed within the housing and connected to the control circuit. The user interface is disposed on the housing and connected to the control circuit. The power source is disposed on or within the housing and connected to the control circuit.

Another embodiment of the present invention provides an imaging device having a housing, an optoelectronic detector, a beam splitter, a field lens, a mirror, a control circuit, a memory, a user interface and a power source. The housing includes a first portion and a second portion. The first portion of the housing has a tubular interior configured to be aligned with an optical path of a scope, a distal end configured to be attached to the scope, a proximate end, and an opening substantially perpendicular to the optical path of the scope and proximate to the proximate end. The second portion of the housing is disposed on an exterior of the first portion of the housing and encloses the opening of the first portion of the housing. The optoelectronic detector is mounted within the second portion of the housing. The beam splitter is mounted within the first portion of the housing in line with the optical path of the scope, and proximate to both the opening and the proximate end of the first portion of the housing. The field lens is mounted within the opening of the first portion of the housing and in line with a reflected optical path of the beam splitter. The mirror is mounted within the second portion of the housing such that the reflected optical path of the beam splitter from the field lens is reflected to the optoelectronic detector. The control circuit is disposed within the second portion of the housing and connected to the optoelectronic detector. The memory is disposed within the second portion of the housing and connected to the control circuit. The user interface is disposed on the second portion of the housing and connected to the control circuit. The power source is disposed on or within the second portion of the housing and connected to the control circuit.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. For example, the embodiments described below relate to an imaging device for a gun scope, but are applicable to any type of sighting, spotting or targeting scope.

The imaging device allows one or more images, which someone views thru a gun, sighting, spotting and targeting scope, to be unobtrusively recorded or viewed by another person. Moreover, the imaging device is lightweight and does not materially alter the weight distribution of a gun or the mounting of a scope on the gun. The imaging device can be used for hunting, bird watching, surveillance, training, governmental and military applications, etc.

Figure 1:
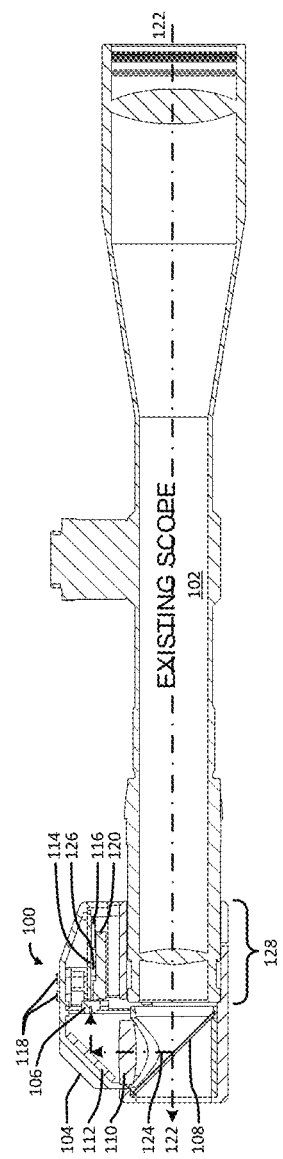
FIG. 1 is a cross-sectional view of an imaging device mounted on a scope in accordance with one embodiment of the present invention.

Now referring to FIG. 1, a cross-sectional view of an imaging device 100 mounted on a scope 102 in accordance with one embodiment of the present invention is shown. The imaging device 100 has a housing 104, an optoelectronic detector 106, a beam splitter 108, a field lens 110, a mirror 112, a control circuit 114, a memory 116, a user interface 118 and a power source 120. The housing 104 is configured to be mounted in an optical path 122 (i.e., line of sight) of the scope 102. The housing 104 can be made of plastic, rubber or other suitable materials. The optoelectronic detector 106 (e.g., camera, etc.) is mounted within the housing 104 outside of the optical path 122 of the scope 102. The beam splitter 108 is mounted within the housing 104 in line with the optical path 122 of the scope 102. The field lens 110 (e.g., a plano convex (PCX) lens, etc.) is mounted within the housing 104 in line with a reflected optical path 124 of the beam splitter 108. The mirror 112 is mounted within the housing 104 such that the reflected optical path 124 of the beam splitter 108 from the field lens 110 is reflected to the optoelectronic detector 106.

The control circuit 114 is disposed within the housing 104 and connected to the optoelectronic detector 106. Note that the control circuit 114 may perform various image processing functions, such as enhancing or filtering the image captured by the optoelectronic detector 106. Moreover, the control circuit 114 may automatically turn the imaging device 100 off based on a timer, an absence of light detected by the optoelectronic detector 106, or a combination thereof. The memory 116 (e.g., flash memory, a secure digital (SD) card, etc.), which can be removable, is disposed within the housing 104 and connected to the control circuit 114. The user interface 118 (e.g., buttons, etc.) is disposed on the housing 104 and connected to the control circuit 114. The user interface 118 may include various buttons or controls, such as an on/off switch, one or more image adjustment controls, one or more light adjustment controls, one or more data connectors, or a combination thereof. The power source 120 (e.g., battery, etc.) is disposed on or within the housing 104 and connected to the control circuit 114. The power source 120 can be a battery, a solar cell, a power connector, or a combination thereof.

The optical path 122 projects the subject to the eye of the person looking through the scope 102. The beam splitter 108 transmits the image light to both the pupil of the person looking through the scope 102 and the optoelectronic detector 106. The field lens 110 increases the size of the image and decreases the eye relief to allow the optoelectronic detector 106 to be positioned closer to the mirror 112, which reduces the size of the imaging device 100. The optoelectronic detector 106 records the image presented by the beam splitter 108 to the memory 116 for later retrieval. The imaging device 100 may include a data/power connector 126 (e.g., a universal serial bus (USB), etc.) connected to the control circuit 114 that allows a user to access the control circuit 114 to configure various settings, the memory 116 to retrieve stored or real-time images, or recharge the power source 120. The imaging device 100 may also include a wireless transceiver disposed on or within the housing 104 and connected to the control circuit 114 that allows data to be sent to and received from a remote device.

The housing 104 includes a recessed portion 128 aligned with the optical path 122 of the scope 102 that frictionally engages the scope 102 such that tools are not required. The optoelectronic detector 106, the control circuit 114, the memory 116, the user interface 118 and the power source 120 are disposed above or partially disposed above the recessed portion 128. The housing 104 may also be secured to the scope 102 using one or more fasteners attached to the housing 104 that engage the scope 102.

Figure 2:
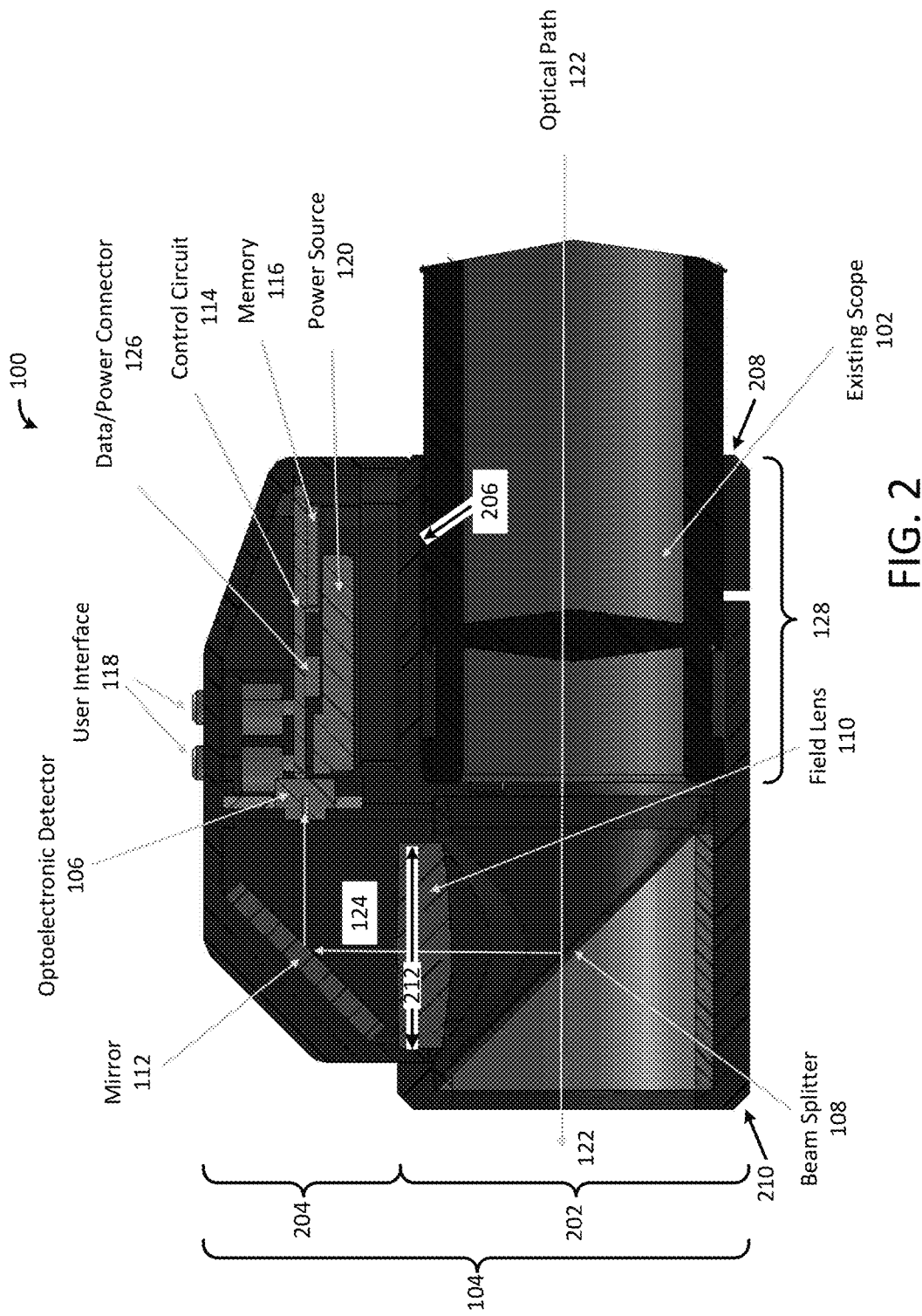
FIG. 2 is a cross-sectional view of an imaging device in accordance with one embodiment of the present invention.

Referring now to FIG. 2, a cross-sectional view of an imaging device 100 in accordance with one embodiment of the present invention is shown. The imaging device 100 has a housing 104, an optoelectronic detector 106, a beam splitter 108, a field lens 110, a mirror 112, a control circuit 114, a memory 116, a user interface 118 and a power source 120. The housing 104 includes a first portion 202 and a second portion 204. The first portion 202 of the housing 104 has a tubular interior 206 configured to be aligned with an optical path 122 (i.e., line of sight) of the scope 102, a distal end 208 configured to be attached to the scope 102, a proximate end 210, and an opening 212 substantially perpendicular to the optical path 122 of the scope 100 and proximate to the proximate end 210. The second portion 204 of the housing 104 is disposed on an exterior of the first portion 202 of the housing 104 and encloses the opening 212 of the first portion 202 of the housing 104. The housing 104 can be made of plastic, rubber or other suitable materials.

The optoelectronic detector 106 (e.g., camera, etc.) is mounted within the second portion 204 of the housing 104 outside of the optical path 122 of the scope 102. The beam splitter 108 is mounted within the first portion 202 of the housing 104 in line with the optical path 122 of the scope 102, and proximate to both the opening 212 and the proximate end 210 of the first portion 202 of the housing 104. The field lens 110 (e.g., a plano convex (PCX) lens, etc.) is mounted within the opening 212 of the first portion 202 of housing 104 in line with a reflected optical path 124 of the beam splitter 108. The mirror 112 is mounted within the second portion 204 of the housing 104 such that the reflected optical path 124 of the beam splitter 108 from the field lens 110 is reflected to the optoelectronic detector 106.

The control circuit 114 is disposed within the second portion 204 of the housing 104 and connected to the optoelectronic detector 106. Note that the control circuit 114 may perform various image processing functions, such as enhancing or filtering the image captured by the optoelectronic detector 106. Moreover, the control circuit 114 may automatically turn the imaging device 100 off based on a timer, an absence of light detected by the optoelectronic detector 106, or a combination thereof. The memory 116 (e.g., flash memory, a secure digital (SD) card, etc.), which can be removable, is disposed within the second portion 204 of the housing 104 and connected to the control circuit 114. The user interface 118 (e.g., buttons, etc.) is disposed on the second portion 204 of the housing 104 and connected to the control circuit 114. The user interface 118 may include various buttons or controls, such as an on/off switch, one or more image adjustment controls, one or more light adjustment controls, one or more data connectors, or a combination thereof. The power source 120 (e.g., battery, etc.) is disposed on or within the second portion 204 of the housing 104 and connected to the control circuit 114. The power source 120 can be a battery, a solar cell, a power connector, or a combination thereof.

The optical path 122 projects the subject to the eye of the person looking through the scope 102. The beam splitter 108 transmits the image light to both the pupil of the person looking through the scope 102 and the optoelectronic detector 106. The field lens 110 increases the size of the image and decreases the eye relief to allow the optoelectronic detector 106 to be positioned closer to the mirror 112, which reduces the size of the imaging device 100. The optoelectronic detector 106 records the image presented by the beam splitter 108 to the memory 116 for later retrieval. The imaging device 100 may include a data/power connector 126 (e.g., a universal serial bus (USB), etc.) connected to the control circuit 114 that allows a user to access the control circuit 114 to configure various settings, the memory 116 to retrieve stored or real-time images, or recharge the power source 120. The imaging device 100 may also include a wireless transceiver disposed on or within the housing 104 and connected to the control circuit 144 that allows data to be sent to and received from a remote device.

The housing 104 includes a recessed portion 128 aligned with the optical path 122 of the scope 102 that frictionally engages the scope 102 such that tools are not required. The optoelectronic detector 106, the control circuit 114, the memory 116, the user interface 118 and the power source 120 are disposed above or partially disposed above the recessed portion 128. The housing 104 may also be secured to the scope 102 using one or more fasteners attached to the housing 104 that engage the scope 102.

Figure 3:
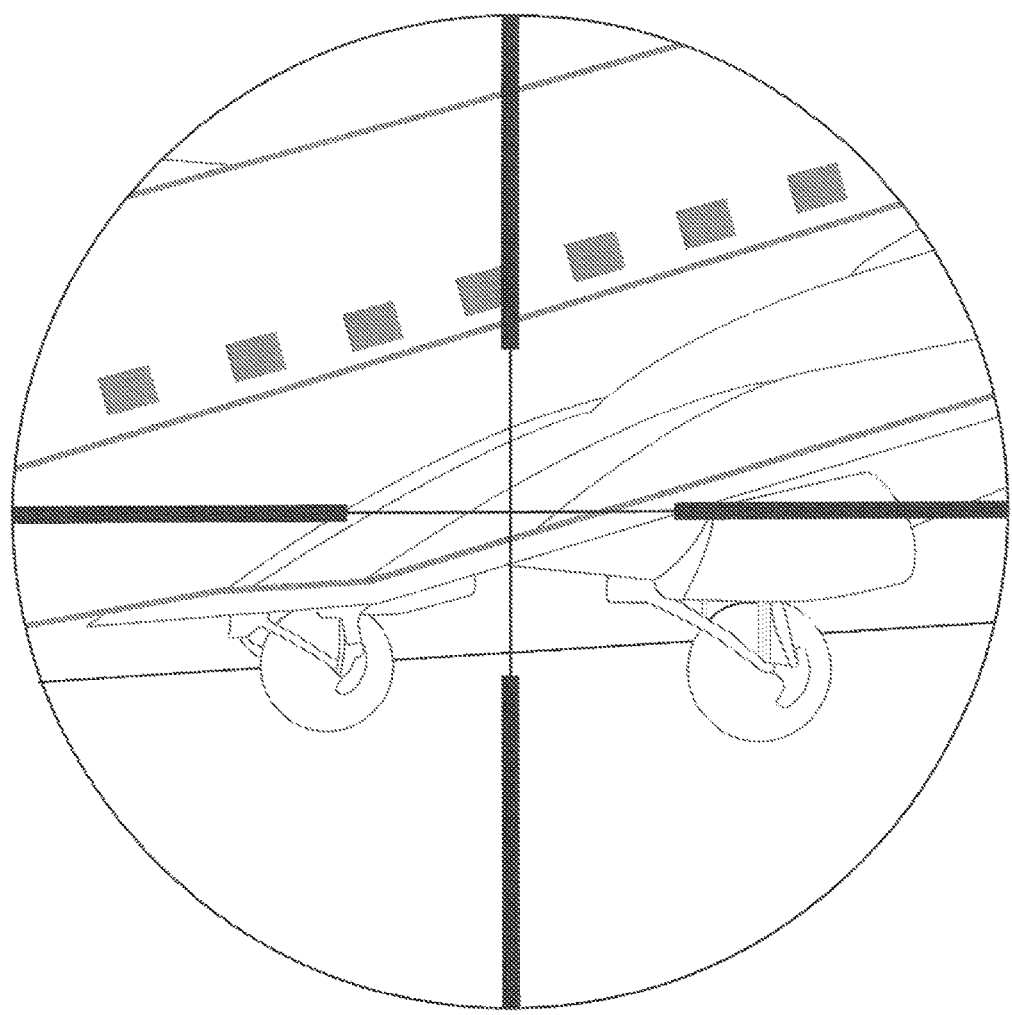
FIG. 3 is an image taken through a scope using an imaging device in accordance with one embodiment of the present invention.

FIG. 3 depicts an example of an image that can be captured and stored through a scope using an imaging device in accordance with one embodiment of the present invention.

Figure 4A:
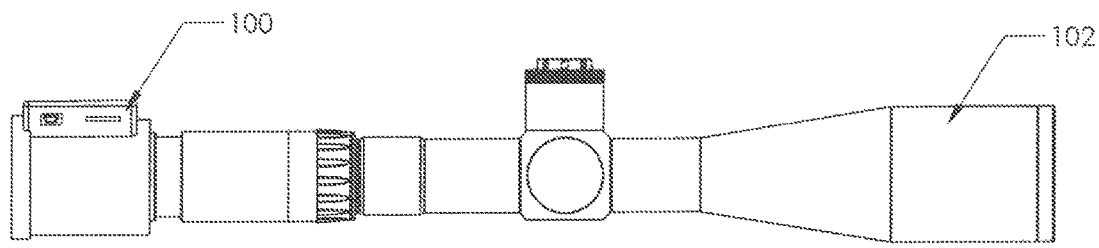
FIGS. 4A-4B are images of an imaging device mounted on a scope in accordance with one embodiment of the present invention.
Figure 4B:
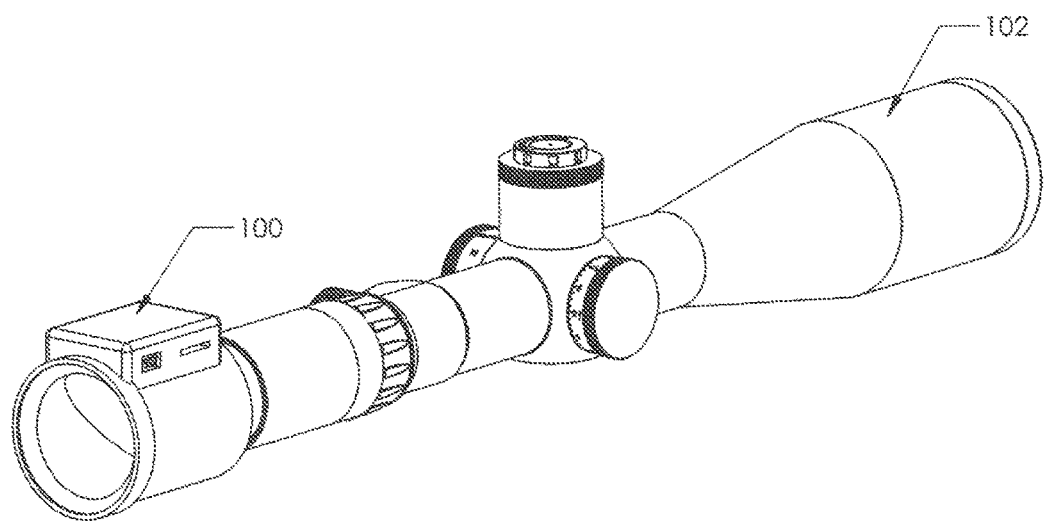

FIGS. 4A-4B are images of an imaging device 100 mounted on a scope 102 in accordance with one embodiment of the present invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

To facilitate the understanding of this invention, a number of terms are defined below. Terms defined herein have meanings as commonly understood by a person of ordinary skill in the areas relevant to the present invention, and their usage does not delimit the invention, except as outlined in the claims. Terms such as "a", "an" and "the" are not intended to refer to only a singular entity, but include the general class of which a specific example may be used for illustration, such as "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the devices, compositions and/or methods disclosed and claimed herein can be made and executed without undue experimentation in light of the present disclosure. While the devices, compositions and methods of this invention have been described in terms of preferred embodiments, it will be apparent to those of skill in the art that variations may be applied to the devices, compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. An imaging device comprising:
a housing configured to be mounted in an optical path of a scope;
an optoelectronic detector mounted within the housing outside of the optical path of the scope;
a beam splitter mounted within the housing in line with the optical path of the scope;
a field lens mounted within the housing in line with a reflected optical path of the beam splitter;
a mirror mounted within the housing such that the reflected optical path of the beam splitter from the field lens is reflected to the optoelectronic detector;
a control circuit disposed within the housing and connected to the optoelectronic detector;
a memory disposed within the housing and connected to the control circuit;
a user interface disposed on the housing and connected to the control circuit; and
a power source disposed on or within the housing and connected to the control circuit.

2. The imaging device as recited in claim 1, wherein:
the housing comprises a first portion and a second portion;
the first portion of the housing having a tubular interior configured to be aligned with the optical path of the scope, a distal end configured to be attached to the scope, a proximate end, and an opening substantially perpendicular to the optical path of the scope and proximate to the proximate end;
the second portion of the housing disposed on an exterior of the first portion of the housing and enclosing the opening of the first portion of the housing;
the beam splitter is disposed within the first portion of the housing proximate to the opening and the proximate end of the first portion of the housing;
the field lens is disposed within the opening of the first portion of the housing;
the mirror is disposed within the second portion of the housing;
the optoelectronic detector is disposed within the second portion of the housing;

the control circuit is disposed within the second portion of the housing;
the memory is disposed within the second portion of the housing;
the user interface is disposed on the second portion of the housing; and
the power source is disposed on or within the second portion of the housing.

3. The imaging device as recited in claim 1, wherein the housing is made of plastic or rubber.

4. The imaging device as recited in claim 1, wherein the field lens comprises a plano convex (PCX) lens.

5. The imaging device as recited in claim 1, further comprising a wireless transceiver disposed on or within the housing and connected to the control circuit.

6. The imaging device as recited in claim 1, wherein the power source comprises a battery, a solar cell, a power connector, or a combination thereof.

7. The imaging device as recited in claim 1, wherein the user interface comprises an on/off switch, one or more image adjustment controls, one or more light adjustment controls, one or more data connectors, or a combination thereof.

8. The imaging device as recited in claim 1, further comprising a data/power connector connected to the control circuit that provides access the control circuit and the memory, and recharges the power source.

9. The imaging device as recited in claim 1, wherein the scope comprises a gun scope, a sighting scope, a spotting scope or a targeting scope.

10. The imaging device as recited in claim 1, wherein the memory comprises a removable memory card.

11. The imaging device as recited in claim 1, wherein the housing further comprises a recessed portion aligned with the optical path of the scope that frictionally engages the scope.

12. The imaging device as recited in claim 11, wherein the optoelectronic detector, the control circuit, the memory, the user interface and the power source are disposed above the recessed portion.

13. The imaging device as recited in claim 1, further comprising one or more fasteners attached to the housing that engage the scope.

14. The imaging device as recited in claim 1, wherein the control circuit enhances or filters an image captured by the optoelectronic detector.

15. The imaging device as recited in claim 1, wherein the control circuit automatically turns the imaging device off based on a timer, an absence of light detected by the optoelectronic detector, or a combination thereof.

16. An imaging device comprising:
a housing comprising a first portion and a second portion;
the first portion of the housing having a tubular interior configured to be aligned with an optical path of a scope, a distal end configured to be attached to the scope, a proximate end, and an opening substantially perpendicular to the optical path of the scope and proximate to the proximate end;
the second portion of the housing disposed on an exterior of the first portion of the housing and enclosing the opening of the first portion of the housing;
an optoelectronic detector mounted within the second portion of the housing;
a beam splitter mounted within the first portion of the housing in line with the optical path of the scope, and proximate to both the opening and the proximate end of the first portion of the housing;
a field lens mounted within the opening of the first portion of the housing and in line with a reflected optical path of the beam splitter;
a mirror mounted within the second portion of the housing such that the reflected optical path of the beam splitter from the field lens is reflected to the optoelectronic detector;
a control circuit disposed within the second portion of the housing and connected to the optoelectronic detector;
a memory disposed within the second portion of the housing and connected to the control circuit;
a user interface disposed on the second portion of the housing and connected to the control circuit; and
a power source disposed on or within the second portion of the housing and connected to the control circuit.

17. The imaging device as recited in claim 16, wherein the housing is made of plastic or rubber.

18. The imaging device as recited in claim 16, wherein the field lens comprises a plano convex (PCX) lens.

19. The imaging device as recited in claim 16, further comprising a wireless transceiver disposed on or within the housing and connected to the control circuit.

20. The imaging device as recited in claim 16, wherein the power source comprises a battery, a solar cell, a power connector, or a combination thereof.

21. The imaging device as recited in claim 16, wherein the user interface comprises an on/off switch, one or more image adjustment controls, one or more light adjustment controls, one or more data connectors, or a combination thereof.

22. The imaging device as recited in claim 16, further comprising a data/power connector connected to the control circuit that provides access the control circuit and the memory, and recharges the power source.

23. The imaging device as recited in claim 16, wherein the scope comprises a gun scope, a sighting scope, a spotting scope or a targeting scope.

24. The imaging device as recited in claim 16, wherein the memory comprises a removable memory card.

25. The imaging device as recited in claim 16, further comprising one or more fasteners attached to the housing that engage the scope.

26. The imaging device as recited in claim 16, wherein the control circuit enhances or filters an image captured by the optoelectronic detector.

27. The imaging device as recited in claim 16, wherein the control circuit automatically turns the imaging device off based on a timer, an absence of light detected by the optoelectronic detector, or a combination thereof.

* * * * *